(12) United States Patent
Fraleigh et al.

(10) Patent No.: US 7,487,139 B2
(45) Date of Patent: Feb. 3, 2009

(54) METHOD AND SYSTEM FOR FILTERING A TABLE

(75) Inventors: John H. Fraleigh, Raleigh, NC (US); Steven Kim, Raleigh, NC (US); Oludare Adebankole Kumolu-Johnson, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 238 days.

(21) Appl. No.: 11/163,263

(22) Filed: Oct. 12, 2005

(65) Prior Publication Data
US 2007/0083541 A1 Apr. 12, 2007

(51) Int. Cl.
G06F 17/30 (2006.01)

(52) U.S. Cl. .............................. 707/2; 707/4

(58) Field of Classification Search ................. 707/102, 707/1, 2, 4
See application file for complete search history.

(56) References Cited

U.S. PATENT DOCUMENTS

| | | | |
|---|---|---|---|
| 5,619,688 A * | 4/1997 | Bosworth et al. ........... 395/604 |
| 5,623,282 A | 4/1997 | Graham et al. | |
| 5,787,411 A * | 7/1998 | Groff et al. .................... 707/2 |
| 6,411,313 B1 | 6/2002 | Conlon et al. | |
| 6,738,770 B2 * | 5/2004 | Gorman ......................... 707/7 |
| 2001/0003455 A1 | 6/2001 | Grobler | |
| 2002/0143780 A1 | 10/2002 | Gorman | |
| 2003/0120711 A1 | 6/2003 | Katz | |
| 2003/0229848 A1 | 12/2003 | Arend et al. | |
| 2004/0032432 A1* | 2/2004 | Baynger ...................... 345/810 |
| 2005/0034060 A1 | 2/2005 | Kotler et al. | |
| 2005/0091199 A1* | 4/2005 | Focazio et al. ................. 707/3 |
| 2006/0136380 A1* | 6/2006 | Purcell ........................... 707/3 |

* cited by examiner

*Primary Examiner*—Etienne P LeRoux
*Assistant Examiner*—Thuy (Tiffany) Bui
(74) *Attorney, Agent, or Firm*—Charles L. Moore; Moore & Van Allen, PLLC (57) ABSTRACT

A method for filtering a table may include creating a filter in response to a user selecting data in a first table. The method may also include applying the filter to at least one other table in response to a user selecting at least one column in the at least one other table.

1 Claim, 6 Drawing Sheets

| Select | Number | Date | First Name | Last Name | Exempt |
|---|---|---|---|---|---|
| ☐ | 611,001 | May 22, 2000 11:02:31 AM | Gandalf | Grey | ☒ |
| ☐ | 611,002 | May 23, 2000 7:32:51 PM | Mary | Sturgeon | ☒ |
| ☐ | 611,003 | May 21, 2000 5:38:29 AM | Alison | Huml | ☐ |
| ☒ | 611,004 | May 24, 2000 12:00:31 PM | Kathy | Walrath | ☐ |
| ☐ | 611,005 | Jan 14, 2000 5:32:23 AM | Mark | Andrews | ☒ |
| ☒ | 611,006 | Jan 17, 2000 11:55:23 PM | Bilbo | Baggins | ☒ |
| ☐ | 611,007 | Feb 14, 2000 6:33:11 AM | Rich | Southard | ☐ |
| ☐ | 611,008 | Feb 24, 2000 4:32:23 PM | John | Fraleigh | ☒ |
| ☐ | 611,009 | Apr 25, 2000 3:50:31 AM | Wayne | Riley | ☐ |
| ☐ | 611,010 | Apr 2, 2000 5:31:11 PM | Jim | Markham | ☒ |
| ☐ | 611,027 | May 22, 2000 5:12:31 PM | Kim | Kenna | ☐ |
| ☐ | 611,012 | Jun 5, 2000 7:24:56 PM | David | Smith | ☒ |
| ☐ | 611,013 | Jun 12, 2000 8:32:34 AM | Frodo | Baggins | ☐ |
| ☐ | 611,014 | Jun 19, 2000 1:12:01 AM | Phil | Johnson | ☒ |
| ☒ | 611,015 | Jul 4, 2000 6:22:21 PM | Joe | Bohn | ☒ |
| ☐ | 611,016 | Jul 11, 2000 4:32:21 PM | Angela | Robertson | ☒ |
| ☐ | 611,017 | Jul 18, 2000 5:35:21 PM | Rob | Perry | ☐ |
| ☐ | 611,018 | Jul 25, 2000 1:02:03 AM | Sam | Gamgee | ☒ |
| ☐ | 611,019 | Sep 14, 2000 8:02:30 AM | Dave | Klavon | ☐ |
| ☐ | 611,020 | Sep 28, 2000 1:02:31 PM | Kathy | Walrath | ☒ |

FIG. 3A

| Select | Number | Date | First Name | Last Name | Exempt |
|---|---|---|---|---|---|
| Checked | <no filter> | | <no filter> | <no filter> | Checked |
| ☑ | 611,005 | 12/31/01 12:00 PM | Mark | Andrews | ☑ |
| ☑ | 611,008 | Jan 14, 2000 5:32:23 AM | John | Fraleigh | ☑ |
| ☑ | 611,016 | Feb 24, 2000 4:32:23 PM | Angela | Robertson | ☑ |
| | | Jul 11, 2000 4:32:21 PM | | | |

| Select | Number | Date | First Name | Last Name | Exempt |
|---|---|---|---|---|---|
| Checked | <no filter> | | <no filter> | <no filter> | Checked |
| ☑ | 611,005 | 12/31/01 12:00 PM | Mark | Andrews | ☑ |
| ☑ | 611,008 | Jan 14, 2000 5:32:23 AM | John | Fraleigh | ☑ |
| ☑ | 611,016 | Feb 24, 2000 4:32:23 PM | Angela | Robertson | ☑ |
| | | Jul 11, 2000 4:32:21 PM | | | |

| |
|---|
| Andrews |
| Fraleigh |
| Robertson |

| Select | First Name | Last Name | Resource Type |
|---|---|---|---|
| ☐ | Gandalf | Grey | ProfileManager |
| ☐ | Mary | Sturgeon | PolicyRegion |
| ☐ | Alison | Humi | ProfileManager |
| ☐ | Kathy | Walrath | PolicyRegion |
| ☐ | Mark | Andrews | PolicyRegion |
| ☐ | Bilbo | Baggins | PolicyRegion |
| ☐ | Rich | Southard | ManagedNode |
| ☐ | John | Fraleigh | ProfileManager |
| ☐ | Wayne | Riley | ProfileManager |
| ☐ | Jim | Markham | ProfileManager |
| ☐ | Kim | Kenna | PolicyRegion |
| ☐ | David | Smith | PCManagedNode |
| ☐ | Frodo | Baggins | Profile |
| ☐ | Phil | Johnson | Endpoint |
| ☐ | Joe | Bohn | Gateway |
| ☐ | Angela | Robertson | ManagedNode |
| ☐ | Rob | Perry | ProfileManager |
| ☐ | Sam | Gamgee | PolicyRegion |
| ☐ | Dave | Klavon | ProfileManager |
| ☐ | Kathy | Walrath | PolicyRegion |

FIG. 6

| Select | First Name | Last Name | Resource Type |
|---|---|---|---|
| ☐ | Mark | Andrews | PolicyRegion |
| ☐ | John | Fraleigh | ProfileManager |
| ☐ | Angela | Robertson | ManagedNode |

METHOD AND SYSTEM FOR FILTERING A TABLE

BACKGROUND OF THE INVENTION

The present invention relates to tables containing data and extracting specific data from the tables, and more particularly to a method and system for visually filtering a table using criteria from another table.

When working with tables, there is often a need to cross-filter columns of different tables containing the same type of data to extract certain desired information. One procedure is to simply apply a predetermined or form filter to a specific column in a table. However, this procedure may require access to a saved filter and manual alteration of the filter by the user. When the user is presented with multiple tables over which he desires to cross-reference data (for example, within a portal view), the need to efficiently extract data by applying filters based on a set of common data may be cumbersome and will typically require a series of steps to retrieve the desired information.

BRIEF SUMMARY OF THE INVENTION

In accordance with an embodiment of the present invention, a method for filtering a table may include creating a filter in response to a user selecting data in a first table. The method may also include applying the filter to at least one other table in response to a user selecting at least one column in the at least one other table.

In accordance with another embodiment of the present invention, a system for filtering a table may include a table filtering application operable on a processor for a user to visually filter a second table using criteria from a first table. The system may also include a data structure to create and apply a filter to the second table.

In accordance with another embodiment of the present invention, a computer program product for filtering a table may include a computer usable medium having computer usable program code embodied therein. The computer usable medium may include computer usable program code configured to create a filter in response to a user selecting data in a first table. The computer usable medium may also include computer usable program code configured to apply the filter to at least one other table in response to a user selecting at least one column in the at least one other table.

Other aspects and features of the present invention, as defined solely by the claims, will become apparent to those ordinarily skilled in the art upon review of the following non-limited detailed description of the invention in conjunction with the accompanying figures.

BRIEF DESCRIPTION OF THE SEVERAL VIEWS OF THE DRAWINGS

FIGS. 1A and 1B (collectively FIG. 1) are a flow chart of an example of a method for filtering a table in accordance with an embodiment of the present invention.

DETAILED DESCRIPTION OF THE INVENTION

The following detailed description of embodiments refers to the accompanying drawings, which illustrate specific embodiments of the invention. Other embodiments having different structures and operations do not depart from the scope of the present invention.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java, Smalltalk, C++or the like. However, the computer program code for carrying out operations of the present invention may also be written in conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figures 1, 1A:
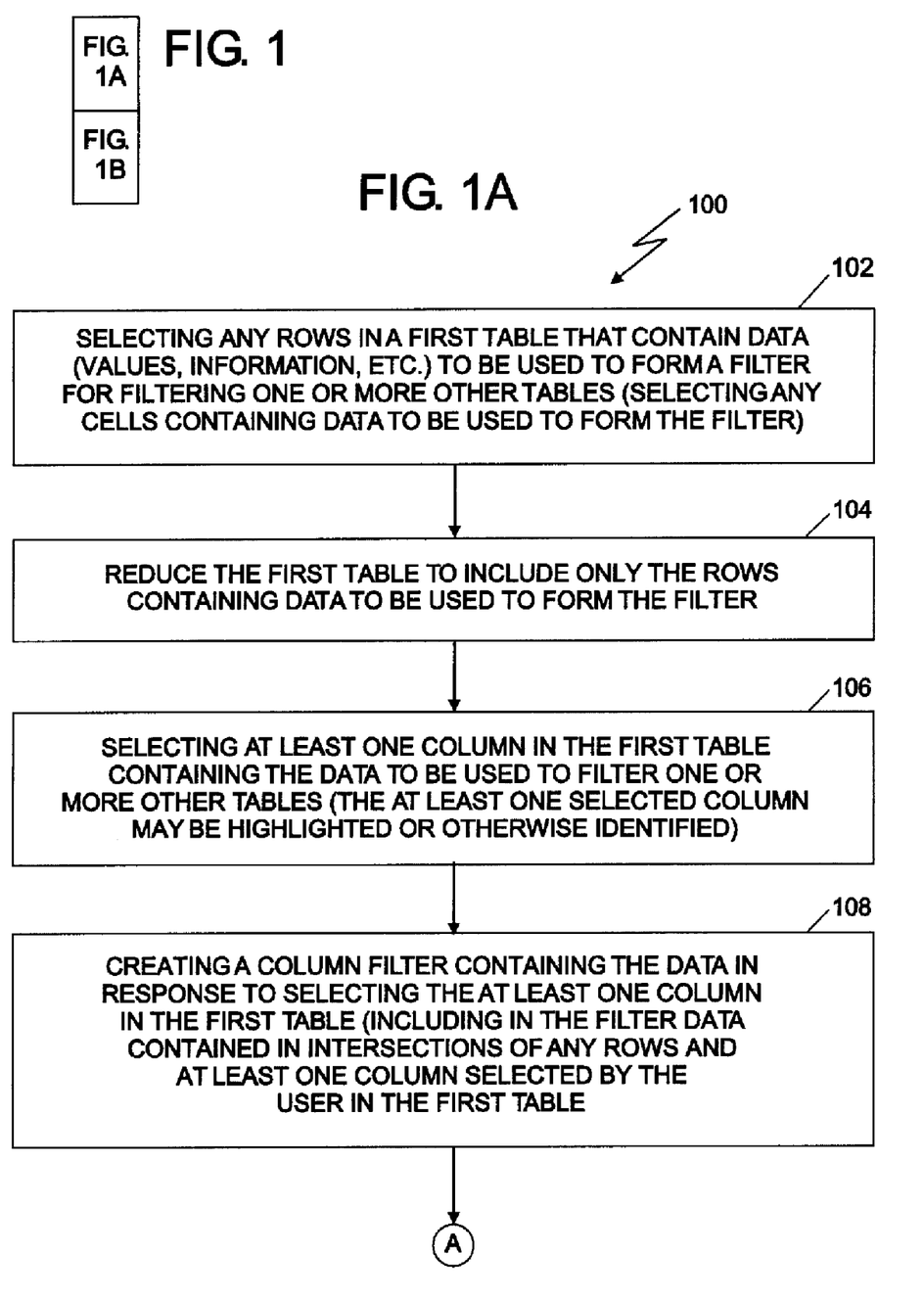
Figure 1B:
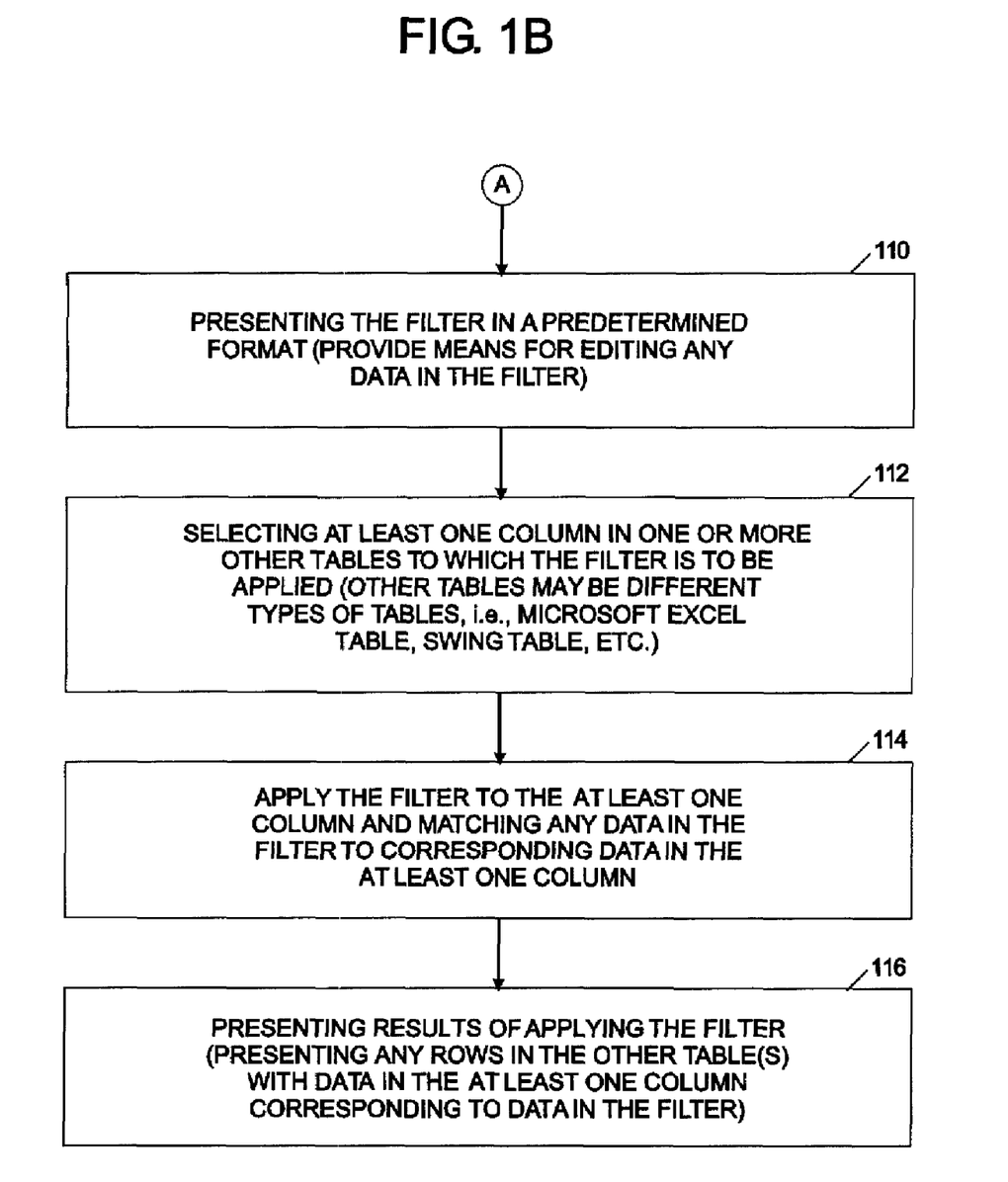
Figure 2:
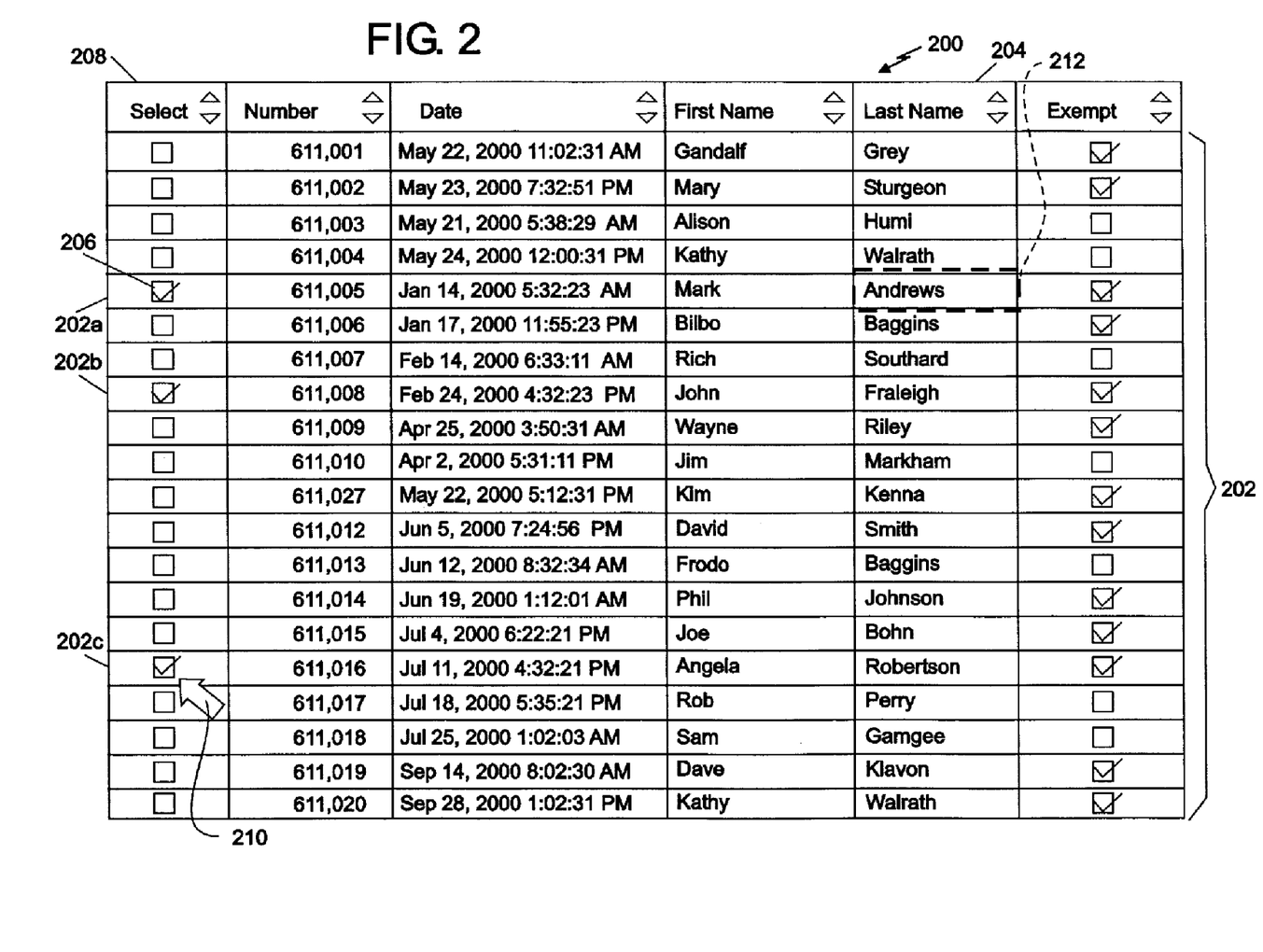
FIG. 2 illustrates a table that will be used as an example to describe operation of the present invention to form a filter for filtering at least one other table in accordance with an embodiment of the present invention.

FIGS. 1A and 1B (collectively FIG. 1) are a flow chart of an example of a method 100 for filtering a table in accordance with an embodiment of the present invention. In block 102, any rows in a first table that contain data to be used to form a filter for filtering one or more other tables may be selected by a user. The data may be values, numbers, text or other information. In another embodiment of the present invention cells containing data to be used in forming a filter may be selected in a first table. The data selected in the cells or rows may also be contained in a selected column of interest. Referring also to FIG. 2, FIG. 2 illustrates a table 200 that will be used as an example to describe operation of the present invention to form a filter for filtering at least one other table in accordance with an embodiment of the present invention. In the exemplary table 200 assume information in at least one other table is of interest related to individuals whose last names are Andrews, Fraleigh and Robertson. Accordingly, rows 202 containing these last names in the column of interest, the column 204 labeled "Last Name," may be selected. The rows 202a, 202b and 202c containing these last names in the column 204 may be selected by clicking on a box 206 in a column 208 that may be labeled "Select" using a computer pointing device or mouse illustrated by the arrow 210 in FIG. 2. In another embodiment of the present invention, a cell 212 containing data to be used in the filter may be selected by a clicking operation using a computer pointing device or other means for selecting the specific cell 212 or cells of interest to be used in the filter. In other embodiments of the present invention, a row 202 or cell 212 containing data to be used in a filter may be selected by other means, such as those commonly used in association with computer systems or the like.

Figure 3A:
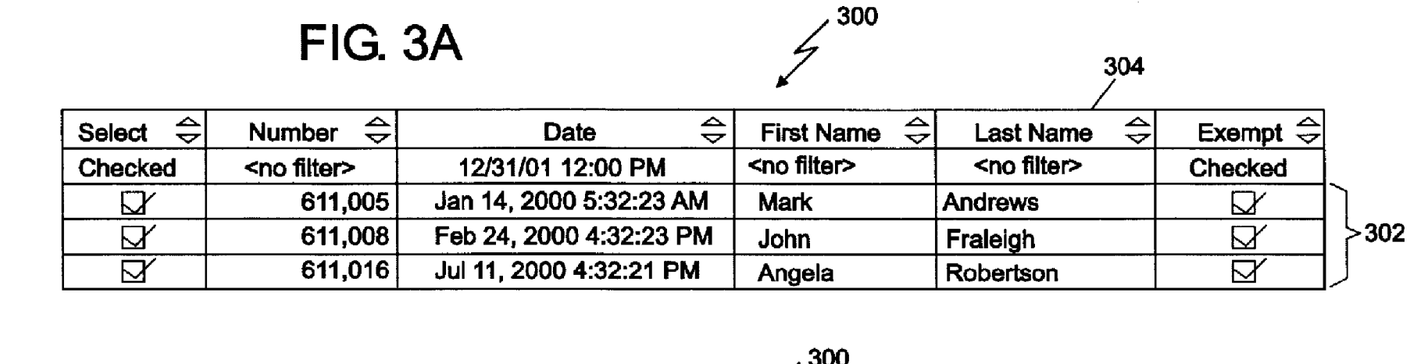
FIG. 3A is an example of a reduced table that may be presented to a user in response to selecting rows or cells in a first table that contain data to form a filter for filtering one or more other tables in accordance with an embodiment of the present invention.

After selecting the cells or rows containing data of interest to be used in a filter for filtering one or more other tables, in block 104 (FIG. 1), the first table 200 may be reduced to include only the rows containing data to be used to form the filter. The reduced table may be presented to the user similar to that illustrated in FIG. 3A. FIG. 3A is an example of a reduced table 300 in response to selecting rows 202 or cells 212 in table 200 (FIG. 2) that contain data to form a filter for filtering another table in accordance with an embodiment of the present invention. The resulting rows 302 are illustrated in FIG. 3A.

Figures 3B, 4:
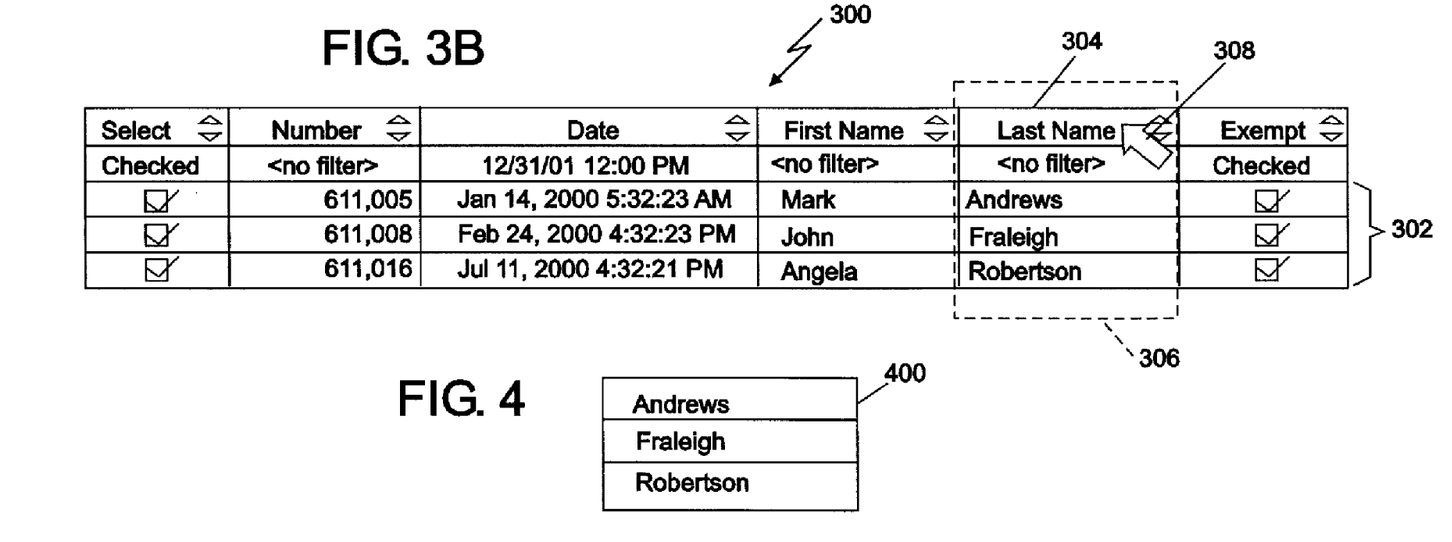
FIG. 3B is an example of selecting a column in a first table containing the data to form the filter in accordance with an embodiment of the present invention.
FIG. 4 is an example of a filter for filtering another table formed or created in accordance with an embodiment of the present invention.

Referring back to FIG. 1, in block 106, at least one column containing data to be used to filter one or more other tables may be selected. Referring also to FIG. 3B, FIG. 3B is an example of selecting a column 304 containing the data to form the filter in accordance with an embodiment of the present invention. In FIG. 3B, the column 304 containing the data of interest to be used in the filter may be labeled "Last Name" or other appropriate identification. The at least one selected column 304 may be highlighted or otherwise identified as illustrated by the dashed or broken line 306 in FIG. 3B around column 304. Highlighting or identifying the column 304 may serve to confirm the user's choice of the data to be used in the filter. The column 304 may be selected by a clicking operation or the like using a computer pointing device or the like as illustrated by the arrow 308 in FIG. 3B. For example, the computer pointing device 308 may be positioned over the column heading or anywhere on the column and then a right click operation may be performed by the user or a similar operation to select the column 304. The selected column 304 may then be highlighted or otherwise identified to confirm to the user's selection of the column 304.

While only a single column is illustrated as being selected to form the filter in FIG. 3B, under some circumstances data in more than one column may be of interest in forming a filter, in which case the present invention permits multiple columns to be selected.

Referring back to FIG. 1, in block 108, a filter or column filter containing the data of interest may be created in response to the user selecting one or more columns in the first table 200 or the reduced first table 300 (FIG. 3A). The filter may then contain data contained in intersections between any rows and the at least one column selected by the user in the first table 200. In another embodiment of the present invention, the filter may be created by populating the filter with data from cells at the intersections of selected rows and columns or data from just selected cells of the table.

In block 110, the resulting filter may be presented to the user in a predetermined format. FIG. 4 is an example of a filter 400 for filtering another table in accordance with an embodiment of the present invention. The filter 400 may be a result of selecting the rows and columns containing the data of interest as described above with reference to the examples shown in FIGS. 2-3A and 3.In block 110, means may also be provided for editing any data in the filter.

Referring back to FIG. 1, in block 112, at least one column in one or more other tables may be selected to which the filter may be applied. The filter generated by the method 100 may be applied to different types of tables. For example, even though the filter may be created from one type of table, the filter may be applied to other types of tables or spreadsheets, such as a Microsoft Excel table, a swing table or other types of spreadsheets.

Figure 5:
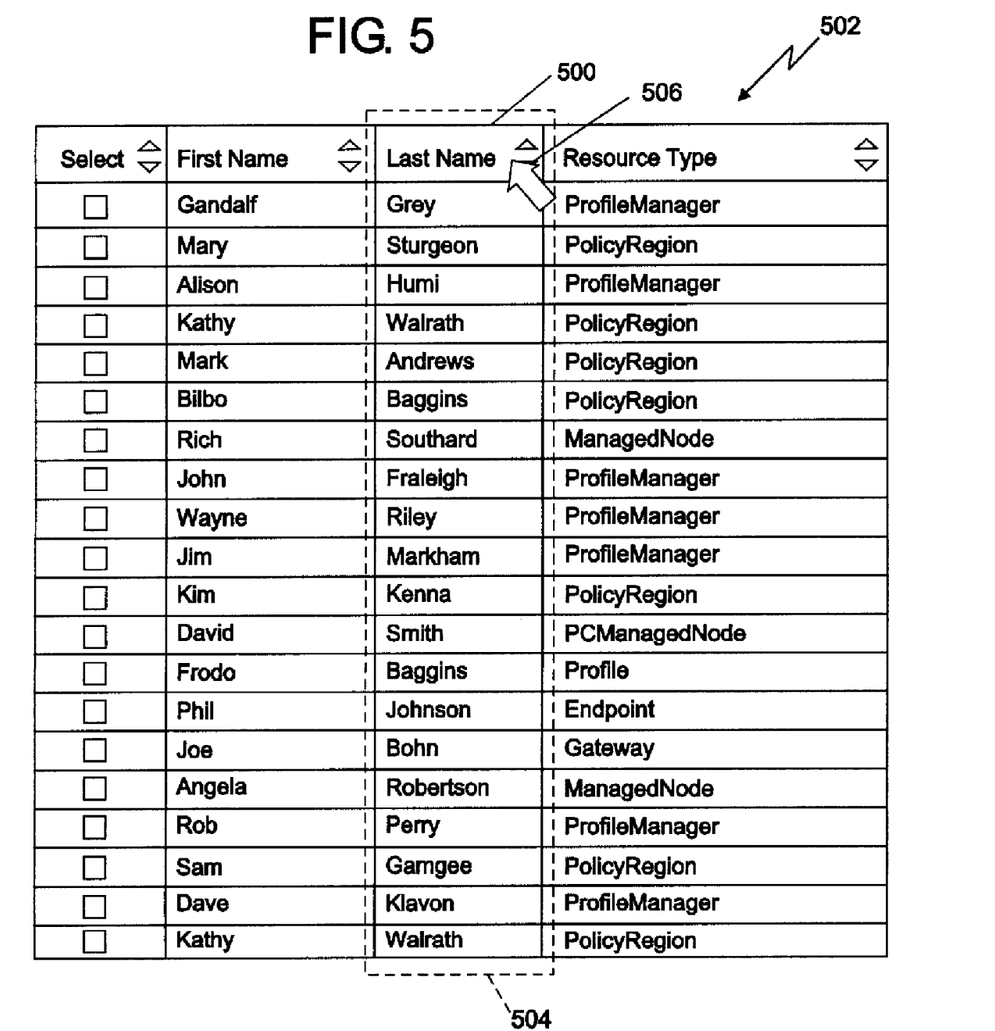
FIG. 5 is an example of selecting a column in another table to which the filter may be applied in accordance with an embodiment of the present invention.

Referring also to FIG. 5, FIG. 5 is an example of selecting a column 500 in another table 502 to which the filter may be applied in accordance with an embodiment of the present invention. The selected column 500 may be highlighted or otherwise identified as illustrated in FIG. 5 by the broken line 504. Highlighting or identifying the column 500 may confirm to the user the column 500 he has selected for applying the filter. The column 500 may be selected by positioning a computer pointing device or the like as represented by arrow 506 in FIG. 5 on the desired column 500 and performing a clicking operation, such as a right click or other function.

While only a single column 500 is illustrated as being selected to apply the filter in FIG. 5, under some circumstances data in more than one column may be of interest to apply the filter or the filter may be a multiple column filter, in such cases the present invention permits the selection of multiple columns in a table to which the filter may be applied.

Figure 6:
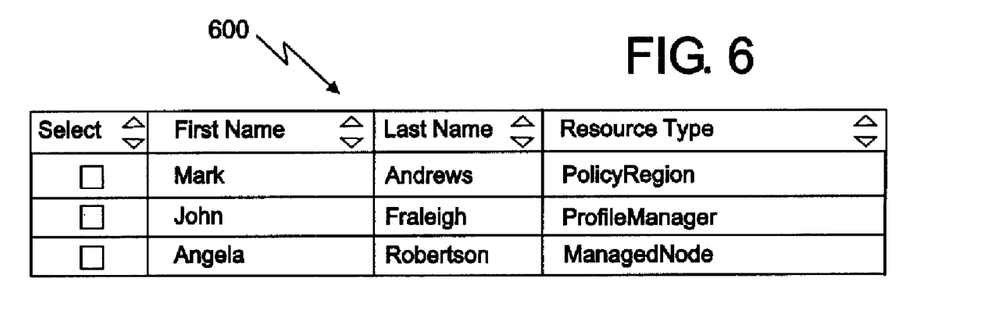
FIG. 6 is an example of results from applying the filter to the selected column in the other table in accordance with an embodiment of the present invention.

Referring back to FIG. 1, in block 114, the filter may be applied to the at least one selected column. Any data in the filter may be matched to corresponding data in the at least one column. In block 116, the results of applying the filter may be presented. The results may be presented by presenting any rows in the table to which the filter was applied with data in the at least one selected column corresponding to data in the filter. FIG. 6 is an example of results 600 or a resulting table from applying the filter to the selected column 500 in the table 502 (FIG. 5) in accordance with an embodiment of the present invention. Only rows containing data matching data in the filter may be presented.

Figure 7:
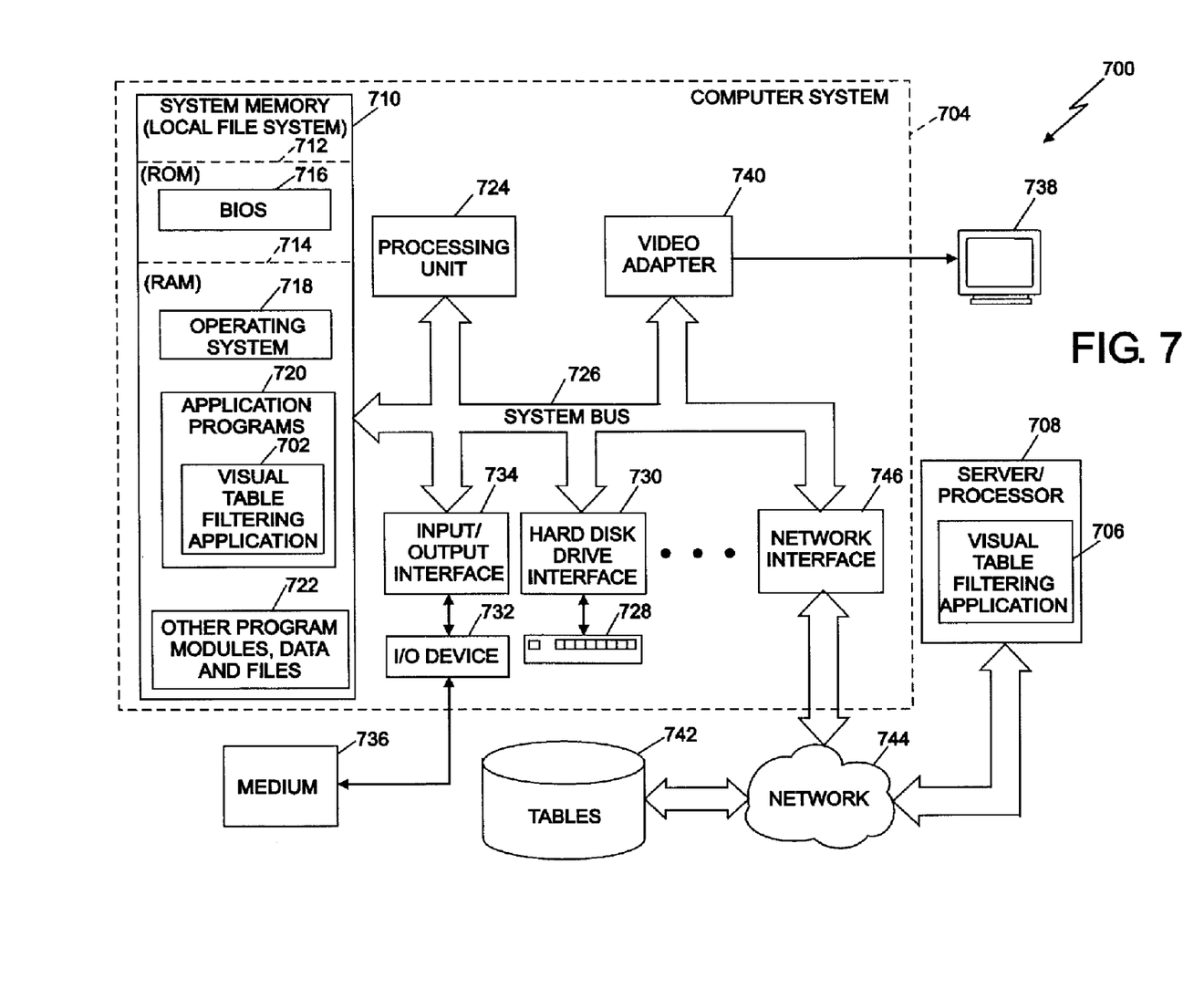
FIG. 7 is a block diagram of an example of a system for filtering a table in accordance with an embodiment of the present invention.

FIG. 7 is a block diagram of an example of a system 700 for filtering a table in accordance with an embodiment of the present invention. Elements of the method 100 may be embodied in the system 700, such as in a visual table filtering application 702 operable on a computer system 704 or a similar visual table filtering application 706 that may be operable on a server or processor, such as server 708.

The computer system 704 may include a system memory or local file system 710. The system memory 710 may include a read only memory (ROM) 712 and a random access memory (RAM) 714. The ROM 712 may include a basic input/output system (BIOS) 716. The BIOS 716 may contain basic routines that help to transfer information between elements or components of the computer system 704. The RAM 714 may contain an operating system 718 to control overall operation of the computer system 704. The RAM 718 may also include application programs 720, other program modules, data and other files 722.

The computer system 704 may also include a processor or processing unit 724 to control operations of the other components of the computer system 704. The processing unit 724 may be coupled to the memory system 710 and other components of the computer system 704 by a system bus 726. The computer system 704 may also include a hard drive 728. The hard drive 728 may be coupled to the system bus 726 by a hard drive interface 730. The hard drive 730 may also form part of the local file system 710. Programs, software and data may be transferred and exchanged between the system memory 710 and the hard drive 728 for operation of the computer system 704.

The computer system 704 may also include multiple input devices, output devices or combination input/output devices 732. The input/output devices 732 may be coupled to the system bus 726 by an input/output interface 734. The input and output devices or combination I/O devices 732 permit a user to operate and interface with the computer system 704 and to control operation of the computer system 704 and programs or applications operating on the computer system, such as the visual table filtering application 702 of the present invention. The I/O devices 732 may include a keyboard and pointing device to select rows or cells in a table as described with respect to the method 100 of FIG. 1. The I/O devices 732 may also include disk drives, optical, mechanical, magnetic, or infrared input/output devices, modems or the like. The I/O devices 732 may be used to access a medium 736. The medium 736 may contain, store, communicate or transport computer-readable or computer executable instructions or other information for use by or in connection with a system, such as the computer system 704. The medium 736 may also include the visual table filter application 702 and the medium 736 may be used to load the application 702 on the computer system 704.

The computer system 704 may also include or be connected to a display or monitor 738. The monitor 738 may be coupled to the system bus 726 by a video adapter 740. The monitor 738 may be used to permit the user to interface with the computer system 704 and to present tables, filters and results from filtered tables as described with respect to FIGS. 1-6.

The computer system 704 may communicate with the server 708 and remote databases 742 or database management systems via a network 744. The databases 742 may include tables that the user may access and cross-reference or cross-filter using the method 100 and system 700 of the present invention. The system bus 726 may be coupled to the network 744 by a network interface 746. The network interface 746 may be a modem, Ethernet card, router, gateway or the like for coupling to the network 744. The coupling may be a wired connection or wireless. The network 744 may be the Internet or private network, such as an intranet, extranet or the like.

The computer system 704 may also access the remote server or processor 708 via the network 744. As previously discussed, the remote server/processor 708 may include a visual table filtering application 706 that may be similar to the application 702. In one embodiment of the present invention, the system 700 may include the visual table filtering application 702 operable on the computer system 704. In another embodiment of the present invention, the visual table filtering application 706 may be provided and operable on the server 708. In still a further embodiment both applications 702 and 706 may be provided with different functions or features be performed different the respective applications. The applications 702 and 706 may embody some or all of the elements or features of the method 100 and may include data structures to present tables and filters similar to those in the examples of FIGS. 2-6.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method for filtering a table, comprising:

presenting a first table to a user;

allowing the user to select at least one row of the table in forming a filter for filtering another table different from the first table;

highlighting the at least one selected row to confirm to the user which row or rows were selected by the user;

reducing the first table to form a reduced table include only the at least one row selected by the user;

presenting the reduced table to the user;

allowing the user to select at least one column of the reduced table to form the filter for filtering the other table different from the first table;

highlighting the at least one selected column to confirm to the user which column or columns were selected by the user to form the filter;

presenting the filter to the user;

allowing the user to edit the filter being presented to the user;

allowing the user to apply the filter to at least the other table; and presenting a resulting table to the user in response to applying the filter to at least the other table.

* * * * *